Aug. 1, 1972 A. MARZOCCHI 3,681,039
APPARATUS AND METHOD OF REMOVING EXCESS LIQUID
COATING FROM GLASS FILAMENTS
Filed June 9, 1970 4 Sheets-Sheet 1
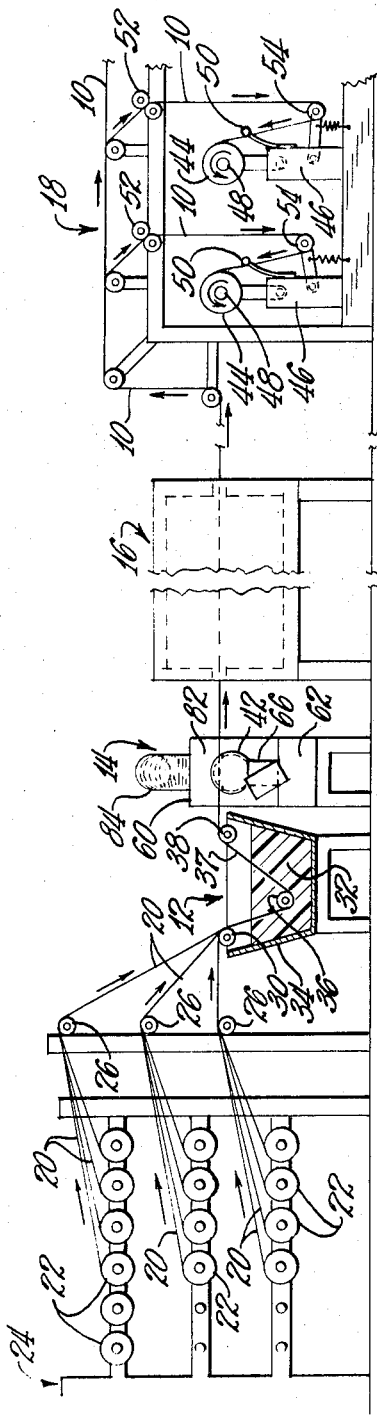
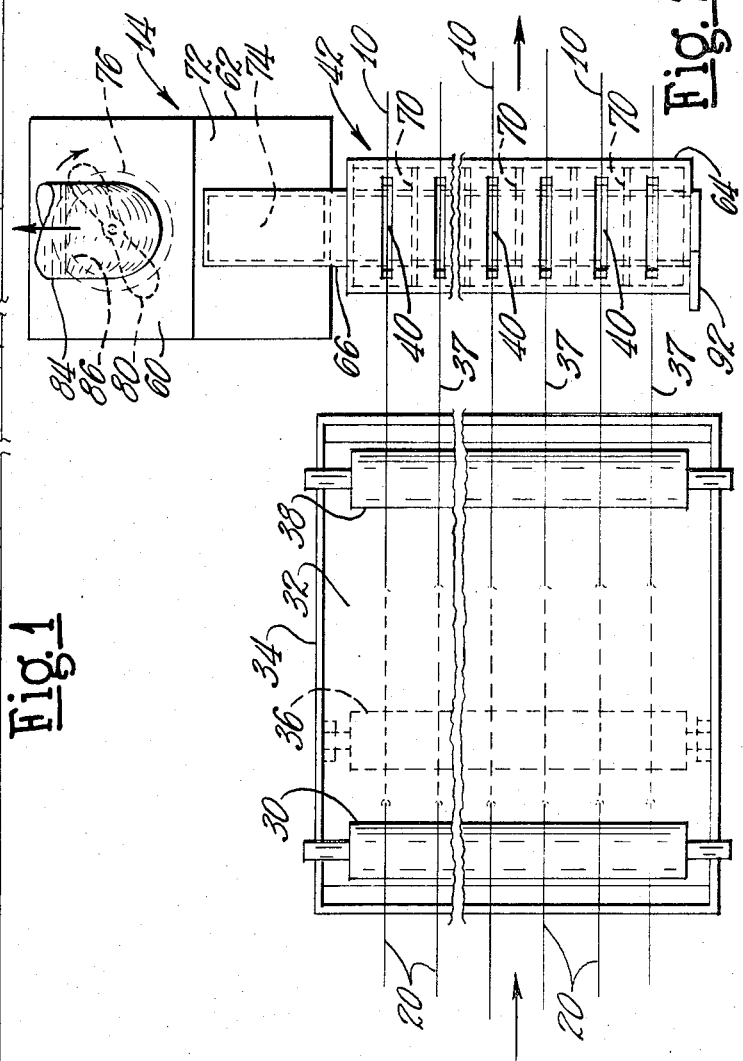
INVENTOR
ALFRED MARZOCCHI
BY
*Starling & Overman*
ATTORNEYS

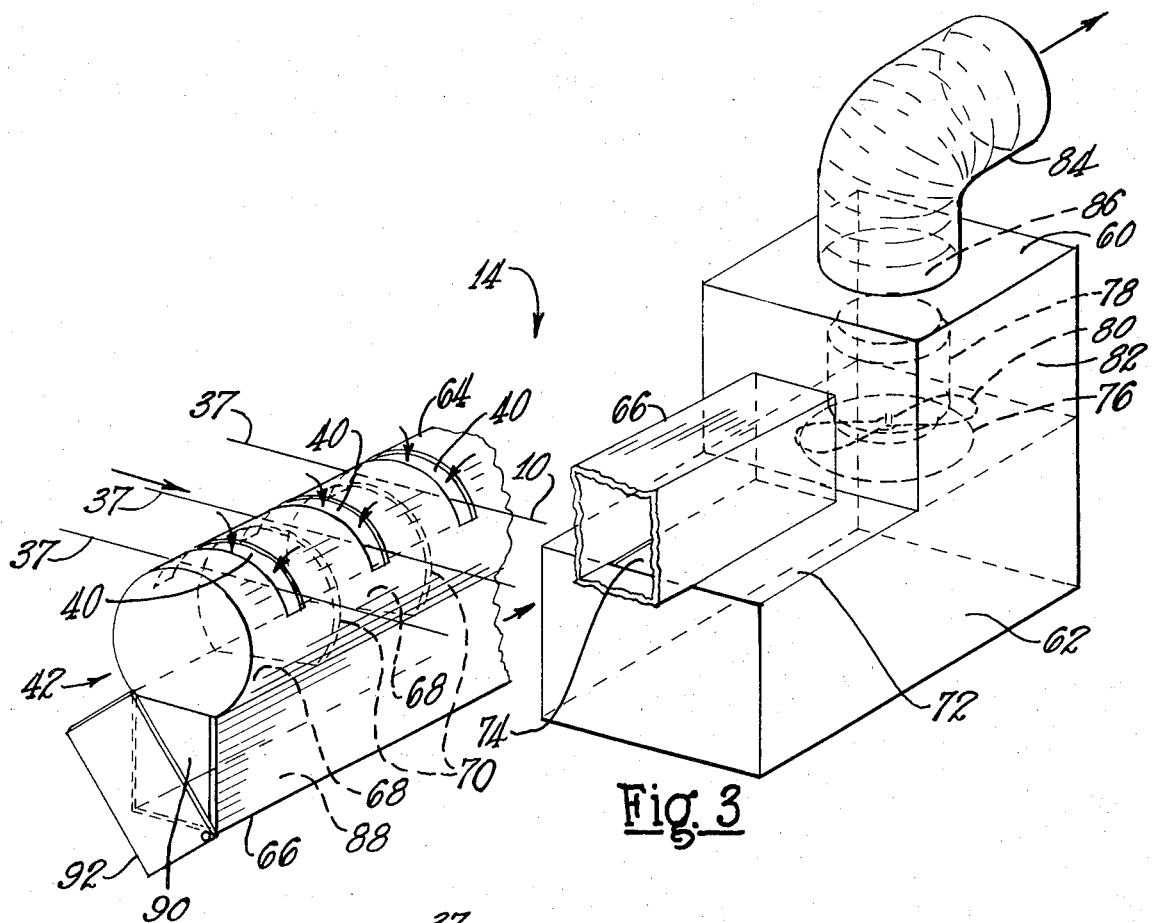
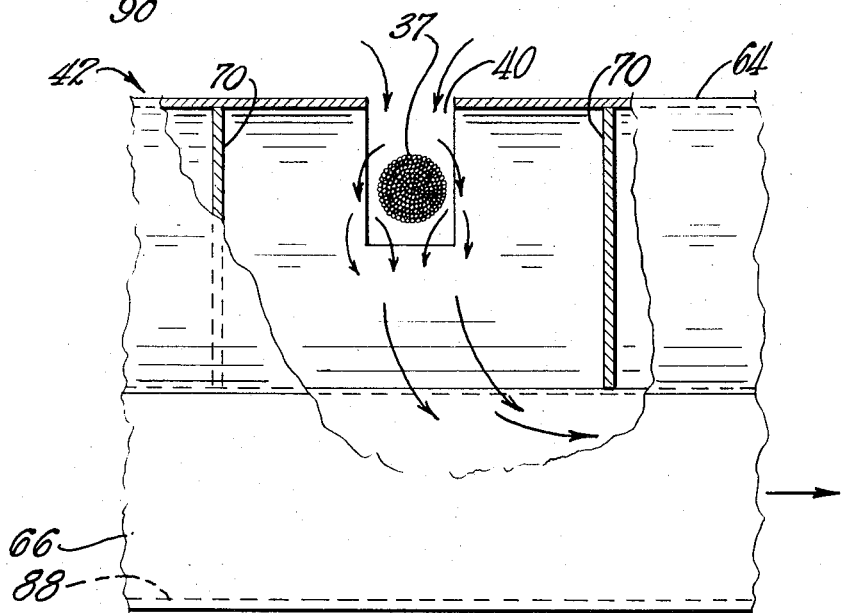

INVENTOR.
ALFRED MARZOCCHI
BY
ATTORNEYS

Aug. 1, 1972    A. MARZOCCHI    3,681,039
APPARATUS AND METHOD OF REMOVING EXCESS LIQUID
COATING FROM GLASS FILAMENTS
Filed June 9, 1970    4 Sheets-Sheet 4

INVENTOR.
ALFRED MARZOCCHI
BY
*Staelin + Overman*
ATTORNEYS

United States Patent Office 3,681,039
Patented Aug. 1, 1972

3,681,039
APPARATUS AND METHOD OF REMOVING EXCESS LIQUID COATING FROM GLASS FILAMENTS
Alfred Marzocchi, Cumberland, R.I., assignor to Owens-Corning Fiberglas Corporation
Filed June 9, 1970, Ser. No. 44,822
Int. Cl. C03c 25/02
U.S. Cl. 65—3                                    6 Claims

ABSTRACT OF THE DISCLOSURE

Apparatus for and method of processing linear material having a coating substance thereon that includes advancing the linear material to a hollow gathering member and providing in the opening of the member a zone of fluid media such as air moving generally transversely of the path of the linear material with sufficient energy to remove unwanted coating substance from the linear material.

BACKGROUND OF THE INVENTION

For various purposes it has been common practice to coat and impregnate multifilament linear material, especially multifilament linear textile material, with a variety of substances. Conventional methods initially apply an excess of a coating substance to linear textile material and subsequently wipe off excesses. For example, prior methods may pass linear textile material through a bath of coating liquid. Thereafter the prior methods wipe excess coating amounts by advancing the linear textile material through an air knife arrangement or a coating die to remove superfluous coating substance from the linear textile material.

These prior methods and apparatus have limitations. Air knife arrangements use high energy air streams pointed generally axially along the path of advancing linear material in a direction opposing movement of the linear material. The air streams impinging advancing linear material both separate coating substance and moves some coating substance along the linear material in a direction opposite to the movement of the linear material.

In use air knife arrangements have severe limitations. Because air knives have more difficulty removing superfluous coating substances of higher viscosities, especially at high speeds, they are generally restricted to slower speed processes using generally lower viscosity coating substances. Then too, frictional engagement of impinging air opposing movement of linear material establishes high tensions in advancing material. As one uses higher energy air streams in processes using higher viscosity coating substances, control of the air streams becomes increasingly more difficult. Turbulent air conditions tend to occur that reduce smooth and even removal of unwanted coating.

Conventional dies, which use openings through a block, also have severe limitations. As processing speeds of linear material increase and the viscosity of coatings also increases, fixed openings, e.g. holes or slots in dies, become ever more a barrier to passage of linear materials through such openings. Tension along linear material increases. Also solid matter in coating liquids tends to clog the die openings. Such clogging destroys effective uniform coatings and can abruptly constrain movement through a die to break linear material.

Both air knife arrangements and conventional coating dies furnish only surface wiping of linear material. Consequently, one can use such means only for coating; one must use other means for impregnating multifilament linear textile material.

Because both arrangements substantially increase tension in an advancing linear material as its speed increases, one cannot use these wiping devices in high speed processes such as in continuous glass filament forming operations that may advance filaments with a linear speed up to 10,000 feet per minute or faster.

It has been the practice to protect glass filaments in continuous glass filament forming operations by applying a sizing liquid or other protective liquid to individual glass filaments prior to combining them into a strand bundle for collection into a wound package of wet glass strand. While such practice causes long subsequent drying operations, the very nature of glass filaments demands the application of a protective liquid before combing individual glass filament into a strand bundle. Unprotected glass filaments tend to abrade each other upon contact. Consequently, processes of forming continuous glass filaments must form a protective coating on the glass filaments before combining them into a strand. Because apparatus cannot exactly control the amount of liquid aplied, prior methods apply excess liquid to the swiftly moving glass filaments gathered into glass strands to avoid locations along the strands having insufficient liquid. Consequently, the wound package of such strands also contains excess liquid.

Subsequent drying of such excessively wet wound strand packages is a long process that causes migration of solids in the sizing or liquid as liquid moves for evaporation at the periphery of packages. Such movement tends to concentrate solids in the strand portions located near the periphery of packages. Because strands from these packages possess varying amounts of solids along their length, strand properties are not uniform. Accordingly, these strands are not wholly satisfactory.

SUMMARY OF THE INVENTION

An object of the invention is improved apparatus for and method of processing linear material having a coating substance on it.

Another object of the invention is apparatus for and method of removing excess coating substance from linear material by applying to the linear material fluid media moving generally transversely of the path of the linear material with sufficient energy to remove the excess coating substance.

Still another object of the invention is apparatus for and method of removing excess coating substance from multifilament linear material such as glass strand by estabishing a region of reduced pressure drawing fluid laterally across the path of the multifilament linear material with sufficient force to remove excess coating substance.

Still another object of the invention is improved apparatus for the method of producing glass strand.

Other objects and advantages of the invention will become apparent as the invention is described hereinafter in more detail with references made to the accompanying drawings.

DESCRIPTION OF THE DRAWINGS

FIG. 1 is a side elevation view of apparatus processing glass strands according to the principles of the invention.

FIG. 2 is a plan view of the strand coating station and coating regulator arrangement of the apparatus illustrated in FIG. 1.

FIG. 3 is a somewhat enlarged perspective view of the coating regulator arrangement shown in FIGS. 1 and 2.

FIG. 4 is an enlarged elevation view partly in section of a slot region of the coating regulator arrangement shown in FIGS. 1-3 and through which glass strands travel.

DESCRIPTION OF THE PREFERRED EMBODIMENTS

Figures 5, 6:
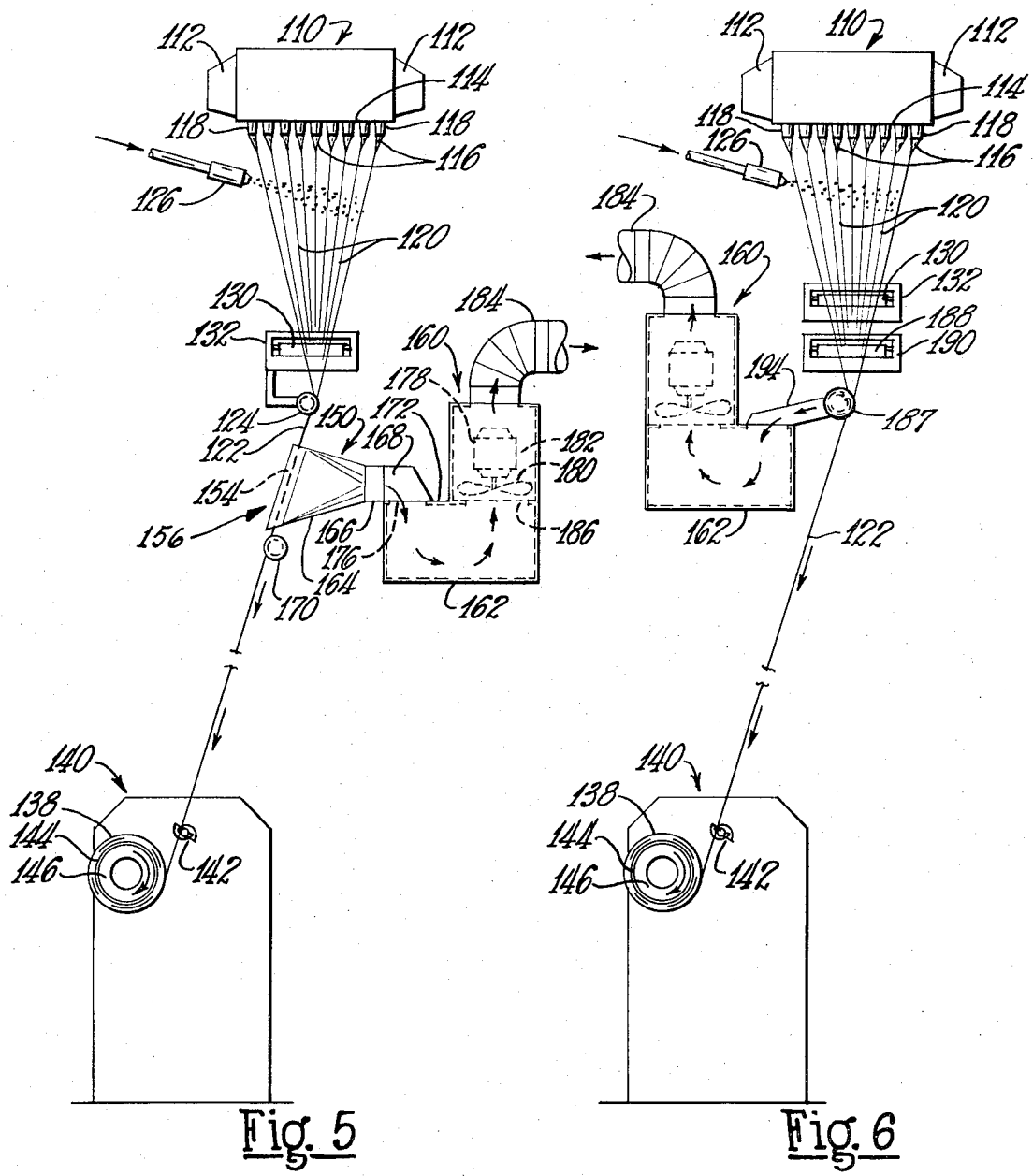
FIG. 5 is a front elevation view of apparatus in a glass filament forming operation processing glass filaments according to the principles of the invention.
FIG. 6 is a front elevation view of apparatus in a continuous glass filament forming operation employing two coating stations and processing the continuous glass filaments according to the principles of the invention.

While the apparatus and method of the invention normally treat multifilament linear textile material, including bundles of continuous filaments such as continuous filament glass strands, they also process other linear materials such as monofilaments or linear material including discontinuous filaments. Further, the invention may treat twisted linear material such as continuous filament glass yarn, cord, etc. Moreover, one may use the apparatus and method of the invention to treat linear material made of a variety of substances such as nylon, polyester and the like. The use of glass strand to explain the invention is an example only.

FIGS. 1 and 2 illustrate apparatus operating to produce a plurality of coated glass strands 10. The apparatus embodies a horizontal process, including a coating station 12, a coating regulator arrangement 14, an oven 16 and a collection arrangement 18.

As shown, individual glass strands 20 travel from separate serving packages 22 held on a creel 24 through guide 26 to the coating station 12.

At the coating station 12 the advancing strands turn on a horizontally extending longitudinal guide bar 30 to advance downwardly into a body of coating liquid 32 held in a container 34. The coating liquid 32 can be any useful coating liquid, e.g. dispersions such as latices and plastisols or polymeric material in solvents. While the strands 20 are advancing within the coating liquid 32 their path changes on a horizontally extending longitudinal guide bar 36. The strands travel upwardly from the body of coating liquid 32 as coated strands 37 to turn on a horizontally extending longitudinal guide bar 38 and to advance horizontally to the coating regulator arrangement 14.

The amount of coating applied over at least part of each of the strands 20 is greater than required for the processed strands 10. Accordingly, the coated strands 37 leave the coating station 12 with an excess or superfluous amount of coating liquid on them.

At the coating regulator arrangement 14 the advancing strands 37 individually travel through slots 40 in a fluid carrying unit 42 for selected removal of some of the coating substance from the traveling strands 37. Because the fluid carrying unit communicates with a reduced pressure zone, the reduced pressure zone draws fluid, in this case air, into the fluid carrying unit 42 through the slots 40. Air drawn into the fluid carrying unit 42 through the slots 40 apply to the advancing strand the forces of moving fluid media generally transversely of the strand paths with sufficient energy to remove the greater coating amounts than needed for the processed strands 10.

The strands 10, with the predetermined desired amount of coating on them, usually advance through a heating means such as the oven 16 to the collection arrangement 18, which is a winding machine. While the oven 16 may treat the coated strands variously depending upon the type of coating and the intended use of the coated strands 10, the oven is normally a thermal oven that dries or cures the coating on the traveling strands. In certain coating situations treatment of a coated strand, e.g. strand 10, by apparatus such as the oven 16 may be unnecessary or even undesirable.

The winding machine 18 collects the coated oven treated strands 10 into individual wound packages 44. As shown the winding machine 18 includes a variable speed drive 46 for rotating individual spools 48, a reciprocating guide 50 for each of the spools 48, a pair of constant speed feeding wheels 52 and a speed control pulley 54. As each of the driven spools 48 advances a coated strand 10, variations in tension along each of the coated strands 10 raises or lowers its individual control pulley 54. Such pulleys control an associated variable speed drive 46 to keep each of the spools 48 rotating at a rate maintaining substantially constant the linear speed of the coated strand 10.

FIGS. 2 and 3 more clearly show the coating regulator arrangement 14, which includes the fluid carrying unit 42, a fluid moving unit 60 and a collection container 62.

The fluid carrying unit 42 is a longitudinal hollow two part member that extends transversely of the paths of the strands 37 and that communicates with the fluid moving unit 60 through the collection container 62. The fluid carrying unit 42 includes an upper tube-like unit 64 and a lower manifold 66 that communicates with the tube-like unit 64 through a longitudinal opening 68 extending lengthwise of the fluid carrying unit 42. The tube-like unit 64 has the slots 40 opening at its upper side; such an arrangement positions the slots 40 opposite the opening 68. The slots 40 open transversely of the tube-like unit 64. Spaced apart partitions 70 within the tube-like unit 64 separate the individual strands 37 as they travel along their paths through the slots 40.

In the embodiment shown in FIGS. 1 through 3, the manifold 66 extends beyond the inner end of the tube-like unit 64 to terminate at the upper side 72 of the collection container 62. An opening 74 connects the manifold 66 with the interior of the collection container 62.

The fluid moving unit 60 is also at the upper side 72 of the collection container 62. An opening 76 connects the fluid moving unit 60 with the collection container 62. As shown, the fluid moving unit 60 includes a fan 78 having blades 80 located within an enclosure 82. An exhaust tube 84 communicates with the interior of the enclosure 82 through an opening 86. Exhaust tube 84 carries fluid from within the enclosure 82 to a remote discharge station not shown.

When the fluid moving unit 60 operates, the blades 80 of the fan 78 rotate to draw or suck air into the fluid carrying unit 42 through the slots 40. The air moves down the manifold 66 into the fluid moving unit 60 through the collection container 62. Air leaves the fluid moving unit 60 through the exhaust tube 86.

In operation the coating regulator arrangement applies to the advancing strand the forces of a moving fluid media, usually air, generally transversely of the strand path with sufficient energy to remove any excess coating substance from the traveling strand; the coating regulator arrangement 14 leaves a predetermined desired amount of coating substance on the traveling strand. In the embodiment shown in FIGS. 1 through 4 apparatus operates to establish a region of reduced pressure within the fluid carrying unit 42 to draw air with selected energy into the slots 40 communicating with the interior of the fluid carrying unit 42. As the strands 37 advance through the slots 40, the reduced pressure zone created by operation of the fluid moving unit 60 draws air across the strand paths with sufficient force to remove superfluous coating from the strands 37. As more plainly seen in FIG. 4, air rushes generally transversely over each strand 37 in a slot 40 downwardly through the tube-like unit 64 into the manifold 66. Coating amounts separated from advancing strands travel with the air movement into the manifold 66. The partitions 70 keep coating substance removed from one traveling strand from being drawn onto another strand. Larger amounts of separated coating fall to the bottom 88 of the manifold 66; smaller discrete portions of separated coating substance move with the air flow down the manifold 66 into the collection container 62 through the opening 74. While the air moves from the collection container 62 through the opening 76, the discrete portions of coating carried by the air tend to fall to the bottom of the container 62. Also coating substance separated from the strands 37 collects on the bottom 88 of the manifold 66 and moves along the manifold to enter the collection container 62 through the opening 74. As shown, the manifold 66 tilts slightly towards the container 62 to move the coating substance on the bottom 88 to the opening 74. As the moving air passes over the advancing strands 37 in the slots 40, the energy of such air impinges the coating substance on the strand with a selected energy to retain a predetermined required amount of the coating substance on the strands 37. In separating superfluous coating liquid, the moving air overcomes surface forces of the coating liquid and the cohesivity of the coating liquid on the strand.

The apparatus of FIGS. 1 through 4 operates to apply coating liquid 32 to at least part of glass strands 20 in amounts greater than required for the processed strands 10. The apparatus advances the glass strands with the greater amounts of coating liquid on them through a zone of air moving generally transversely of the direction of movement of the strand with sufficient energy to remove amounts of coating liquid greater than needed for the processed strand 10.

One can modify in several ways air flow into the slots 40, and consequently the energy of air moving into the slots 40. For example, one may increase the speed of the fan 78. Also, one may adjust the area of an opening 90 at the outer manifold end by moving a pivotally mounted plate 92. As the opening becomes smaller, more air enters the fluid moving unit 60 through the slots 40. Conversely, as the opening becomes larger, air flow through the slots 40 into the fluid moving unit 60 becomes less.

While the embodiment of FIGS. 1 through 4 shows air as the fluid media selectively removing superfluous amounts of a liquid coating on glass strands, one can use a variety of fluids as the removing media and a variety of coating substances. For example, one can use either a liquid or a gas other than air as the removing fluid: moreover, one can employ other coating substances, including water only, or coating powders such as nylon and polyester. One can even use two immiscible liquids, one liquid being the coating substance and the other liquid being the removing media.

Although the embodiment of the invention in FIGS. 1 through 4 discloses coating glass strand, one can operate the apparatus to move fluid, e.g. air, with sufficient energy through the slots 40 to impregnate multifilament linear material with a substance, e.g. a liquid substance. Then too, one can impregnate multifilament linear material with a substance such as a liquid prior to removing excess impregnant.

FIG. 5 shows apparatus treating glass strand in a filament forming operating according to the principles of the invention. In FIG. 5 a container or bushing 110 holds a supply of molten glass. The container 110 may connect to a forehearth that supplies molten glass from a furnace or it may connect to means for supplying glass such as glass marbles that a melter or other means associated with the container 110 reduces to a heat-softened condition. Located on the container 110 are terminals 112 that connect to a source of electrical energy to supply heat to the container 110 by conventional resistance heating to maintain the molten glass at proper filament forming temperatures and viscosities. Moreover, the container 110 provides a filament forming zone at a bottom 114 that includes a plurality of orifices or passageways that delivers streams 116 of molten glass from the container 110. As shown, the passageways are tubular projections 118.

The streams 116 of molten glass are attenuated into individual continuous glass filaments 120 that combine into a glass strand 122 at a gathering shoe 124 located below the container 110.

While the filaments 120 may be protected only by application of water to them, it is desirable in most instances to apply to them a conventional sizing liquid or other coating substance. Nozzle 126 may be located near the bottom 114 to spray water onto the newly formed filaments 120, preferably prior to combining the filaments 120 into the strands 122.

The apparatus of FIG. 5 uses an applicator 130 supported within a housing 132 to apply liquid sizing to the filaments 120. The applicator 130 may be any suitable means known to the art such as endless belt that moves through liquid sizing held in the housing 132. As the filaments 120 pass across the surface of the applicator 130, some of the liquid sizing on the applicator 130 transfers to them. Normally the filaments leaving the applicator 130 have an excess of coating substance on them.

The strand 120 collects as a wound package 138 on a winding machine 140. Strand traversing means 142 on the winding machine 140 moves the advancing strand 122 back and forth lengthwise of the package 138 as the strand 122 winds on a collector, such as a tube 144, telescoped over a spindle or collet 146. The winder 140 appropriately drives the collet 146 in rotation.

The apparatus of FIG. 5 locates a sizing regulator 150 between the package 138 and the gathering shoe 124. Like the regulator arrangement 14, the sizing regulator 150 selectively removes some of the sizing substance, e.g. liquid, from the traveling strand 122 as the strand speeds across the regulator 150. The apparatus shown in FIG. 5 can advance the glass strand 122 with speeds from 5,000 to 10,000 feet per minute or faster. Besides the continuous glass filaments 120 tend to leave the applicator 130 with an excess or superfluous amount of liquid sizing on them, the glass strand 122 tends to leave the gathering shoe 124 with an excess or superfluous amount of sizing liquid on it.

At the sizing regulator 150 the advancing strand 122 travels through a slot at one end of a hollow longitudinal fluid carrying unit 156 for selective removal of some of the sizing from it. Because the longitudinal fluid carrying member 156 communicates with a reduced pressure zone, the reduced pressure zone draws fluid, in this case, air, into the fluid carrying member 156 through a slot 154. Air drawn into the fluid carrying member 156 through the slot 154 applies to the advancing strand 122 the forces of moving fluid media generally transversely across the strand path with sufficient energy to remove excess or superfluous amounts of sizing and leaves on the advancing strand 122 a required amount of liquid sizing.

FIG. 5 shows the sizing regulator to include the fluid carrying member 156, a fluid carrying unit 160 and a collection container 162. The unit 160 and container 162 are like the unit 60 and container 62 shown in FIGS. 1 through 3.

The fluid carrying member 156 includes a hollow tapered transition portion 164 and a tubular portion 166 forming a lengthwise passageway 168 that communicates with the fluid moving unit 160 through the collection container 162. As shown the tubular portion 166 of the longitudinal member 156 terminates at the upper side 172 of the collection container 162. An opening 176 connects the longitudinal hollow fluid carrying member 156 with the interior of the collection container 162. Located below the fluid carrying member 156 is a secondary shoe 170.

The fluid moving unit 160 is also at the upper side 172 of the collection container 162. An opening 186 connects the fluid moving unit 160 with the collection container 162. As shown, the fluid moving unit 160 includes a fan 178 with blades 180 located within an enclosure 182. An exhaust tube 184 communicates with the interior of the enclosure 182 through an opening 186. The exhaust tube 184 carries fluid from within the enclosure 182 to a remote discharge station not shown.

Similar to the coating regulator arrangement 14, the rotating blades 180 of the fan 178 draw or suck air into the fluid carrying member 156 through the slot 154. Air moves down the passageway 164 of the member 156 into the fluid moving unit 160 through the collection container 162. Air leaves the fluid moving unit 160 through the exhaust tube 186.

In operation the sizing liquid regulator 150 applies to the advancing strand 122 the forces of moving fluid media, usually air, generally transversely across the strand path with sufficient energy to remove any superfluous sizing liquid from the traveling strand 122; the sizing regulator 150 leaves a predetermined desired amount of sizing liquid on the traveling strand 122. As air rushes over each strand 122 in the slot 154, the energy of the moving air removes excess sizing, which travels down the passageway 164 into the collection container 162 through the opening 176. The gathering shoe 170 separates the traversing motion imparted to the strand 122 from the sizing regulator 150.

FIG. 6 is a modified embodiment of apparatus treating glass strand according to the principles of the invention shown at the glass filament forming operation illustrated in FIG. 5. In FIG. 6 apparatus applies two coatings to advancing glass filaments, one a sizing coating and the other a special coating such as a latex or plastisol. The gathering shoe 187 also forms part of a coating regulator arrangement very similar to the sizing regulator arrangement 150 shown in FIG. 5. The molten streams 116 are attenuated into the individual continuous glass filaments 120 that pass across the applicator 130 and an applicator 188 prior to being combined into the strand 122. The applicator 130 supported within the housing 132 applies a sizing liquid to the filaments 120. As the filaments 120 pass across the surface of the applicator, some of the liquid sizing on the applicator transfers to them. From the applicator 130 the filaments 120 advances across the applicator 188 that is supported within a housing 190. The applicator 188 may be any suitable means known to the art such as an endless belt that moves to pass through liquid held in the housing 190. As the filaments 120 pass across the surface of the applicator 188, some of the liquid on the applicator transfers to them. Accordingly, filaments 120 advancing to the gathering shoe have two coatings applied to them.

The gathering shoe 187, which forms part of a coating regulator, removes superfluous liquid from the filaments 120 in addition to gathering the filaments 120 into the filament bundle or strand 122. The regulator arrangement is the same as the sizing regulator arrangement 150 shown in FIG. 5 except for the gathering shoe 187 and a longitudinal fluid carrying member 194; supporting the shoe 187, however, the member 194 is similar to the longitudinal fluid carrying member 156 shown in FIG. 5. As more clearly seen in FIGS. 7 and 8, the gathering shoe 187 is a somewhat short generally cylindrical hollow element having a groove configuration 196 in its lengthwise peripheral surface. The groove 196 gathers the filaments 120. The gathering shoe 187 has a somewhat longitudinal opening 198 communicating with its interior. The interior of the shoe 187 communicates with the collection container 162 and fluid moving unit 160 through a passageway 200 extending lengthwise through the fluid carrying unit 194.

As illustrated the opening 198 is located adjacent to the filaments 120 near the end of their paths to the gathering shoe 187. As more clearly seen in FIG. 7, the filaments 120 advance to converge into the strand 122 and turn on the gathering shoe 187 to advance towards the winder 140. The gathering shoe arrangement places the opening 198 at a location spaced slightly above the turning zone of the filaments 120 on the gathering shoe 187.

In operation the coating regulator arrangement applies to the advancing filaments 120 the forces of a moving body of fluid media, usually air, generally transversely across the filament paths with sufficient energy to remove any excess or superfluous coating substance from the traveling filaments prior to gathering and prior to turning on the shoe 187. The coating regulator arrangement leaves a required amount of coating substance on the traveling filaments 120 and consequently on the strand 122. As the filaments 120 advance adjacent to the slot 198, the reduced pressure zone created by operation of the fluid moving unit 160 draws air across the filament paths with sufficient force to remove superfluous coating from the filaments 120. Collection of the separated coating substance and air handling is the same as described with respect to the apparatus of FIG. 5.

Figure 7:
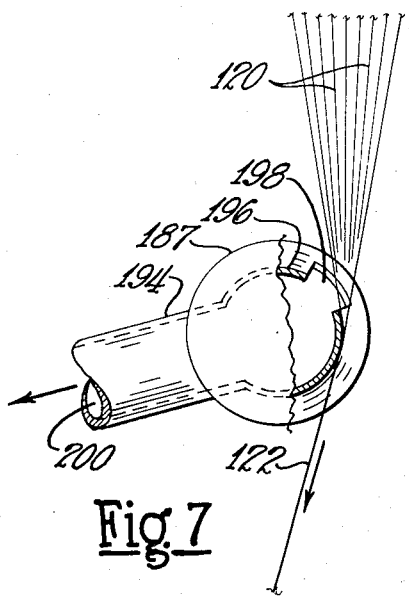
FIG. 7 is an enlarged side elevation view of the gathering shoe arrangement shown in the apparatus of FIG. 6.
Figure 8:
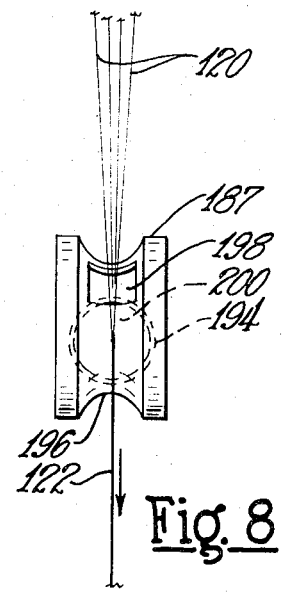
FIG. 8 is a front elevation view of the gathering shoe arrangement shown in FIG. 7.

While one may use the apparatus shown in FIGS. 6 through 8 with a variety of coatings, its operation is especially effective when one of the coatings, e.g. coating substance applied by the applicator 188, is a more highly viscous liquid such as a latex.

While FIGS. 7 and 8 show the opening 198 at a preferred location spaced from the turning zone of the glass filaments 120 just before the shoe 187 gathers the filaments 120 into the strand 122, arrangements may locate the opening 198 at the turning zone. If one locates the opening 198 beyond the turning zone, the filaments 120 advance to the turning zone with excessive coating liquid on them. As the filaments change direction on the shoe 187, the heavier mass of some liquids tend to cause some of such liquid to uncontrollably separate as the filament path changes. Accordingly, the change in path direction, particularly at high speeds found in filament forming operations, tends to uncontrollably fling heavier mass coating substances from the filaments 120. In practice an excess of conventional sizing liquids tend to remain on a traveling strand turning on a gathering shoe.

Figure 9:
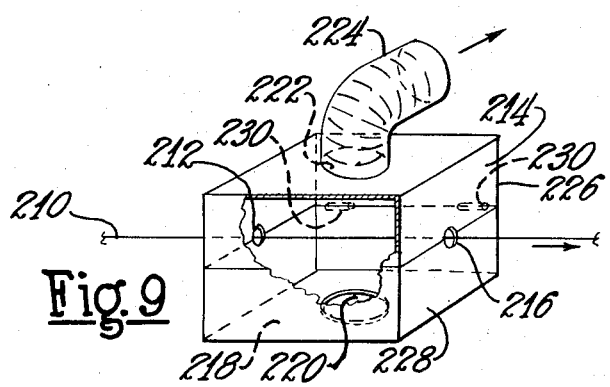
FIG. 9 is a perspective view of another embodiment of apparatus for processing linear material according to the principles of the invention.

FIG. 9 shows modified strand treating apparatus operating according to the principles of the invention. The figure shows a strand 210 advancing from a location with an excess of coating material to pass through a confined zone communicating with a reduced pressure region drawing air generally transversely across the path of the traveling strand 210 with energy sufficient to separate unwanted coating material from the strand 210. The embodiment of FIG. 9 shows the strand 210 traveling through an entrance 212 of an enclosure 214 and leaving the enclosure 214 through an exit 216. The bottom 218 of the enclosure 214 has fluid entrance opening 220; the top of the enclosure 214 has a fluid exit opening 222 that communicates with a reduced pressure zone through a tubular fluid carrying means 224. For easy loading the enclosure 214 includes a top portion 226 and a bottom portion 228 that are hinged together by hinges 230.

As the strand 210 travels through the confined region within the enclosure 214 fluid, e.g. air, drawn across the path of the strand 210 separates superfluous or unwanted coating substance from the strand 210. One may employ apparatus such as the fluid moving units of other embodiments herein to establish the reduced pressure zone for use with the arrangement shown in FIG. 9.

Figure 10:
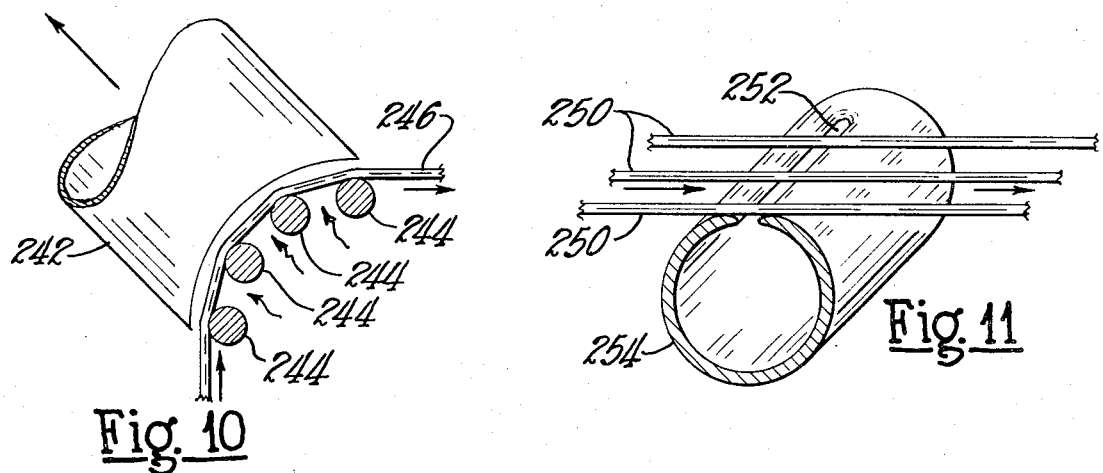
FIG. 10 is a side elevation view of yet another embodiment of apparatus for processing linear material according to the principles of the invention.

FIG. 10 shows another modified embodiment of strand treating apparatus operating according to the principles of the invention. FIG. 10 shows apparatus including a fluid withdrawal means 242 adjacent to the guide bars 244. A strand 246 travels over the guide bars 244. As the strand 246 moves across the mouth of the fluid withdrawal means 242, a fluid moving means establishes a reduced pressure zone that draws fluid into the fluid withdrawal means 242. Suction from the reduced pressure zone through the fluid withdrawal means draws to move fluid, e.g. air, with sufficient force generally transversely across the curved path of the strand traveling across the opening 244 to remove superfluous coating liquid or material from the strand 246. As in the case of the other embodiments, apparatus withdraws the strand 246 from the treating zone with a predetermined desired amount of coating material on it.

Figure 11:
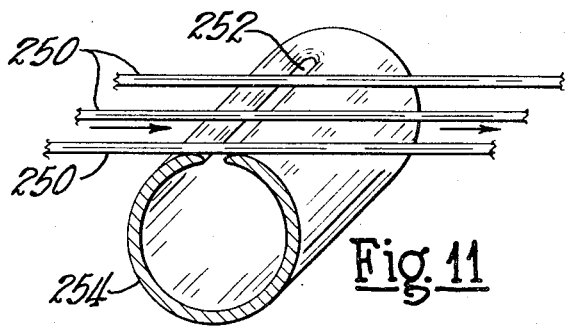
FIG. 11 is a perspective view of linear material advancing transversely across a longitudinal opening in a tubular member for treating the linear material according to the principles of the invention.

FIG. 11 shows yet another embodiment of apparatus operating according to the principles of the invention. The figure shows a strand 250 with excess coating material traveling transversely across a longitudinal opening 252 in a tubular member 254 where the opening 252 communicates with a reduced pressure zone not shown through the interior of the member 254. As the strand 250 moves across the opening 252, the reduced pressure zone draws air laterally of the strand path into the member 254 with sufficient energy to remove excess coating material.

I claim:
1. The method of producing glass strand comprising:
supplying streams of molten glass;
attenuating the streams into continuous glass filaments;
advancing the continuous glass filaments along converging paths to a hollow gathering member having in its filament gathering region an opening to the atmosphere communicating with the interior of the member;
applying a liquid to the continuous glass filaments advancing to the member;
drawing air into the opening of the member with sufficient energy to remove unwanted liquid in a lateral direction from the traveling filaments; and
gathering the advancing filaments into a glass strand at the member.

2. Apparatus for producing glass strands comprising:
means for supplying streams of molten glass;
means for withdrawing continuous glass filaments from the streams of molten glass;
a hollow member for gathering the continuous glass filaments into a glass strand, the member being spaced from the means for supplying streams of molten glass and having at the region of filament gathering an opening from its interior to the atmosphere;
means for applying a liquid to the glass filaments between the hollow member and the means for supplying streams of molten glass; and
means for drawing air into the hollow member through the opening with sufficient energy to remove unwanted liquid from the traveling filaments.

3. Apparatus of claim 2 in which the opening is in the filament gathering location of the member.

4. Apparatus of claim 2 in which the member includes a curved surface for gathering the filaments and the opening from the interior is at such curved surface.
surface.

5. Apparatus of claim 2 in which the member is a disc-like member having a grooved circumferential filament gathering surface.

6. Apparatus of claim 5 in which the opening is adjacent above the location at which the member gathers the filaments into a strand.

References Cited

UNITED STATES PATENTS

| 2,224,149 | 12/1940 | Fisher | 117—126 GQ X |
| 2,234,986 | 3/1941 | Slayter et al. | 65—3 X |
| 2,325,640 | 8/1943 | Thomas et al. | 65—11 W X |
| 2,373,078 | 4/1945 | Kleist | 117—126 GQ X |
| 2,758,048 | 8/1956 | Ceretti | 117—102 L X |
| 2,786,637 | 3/1957 | Russell et al. | |
| 2,911,941 | 11/1959 | Sokal | 65—11 W X |
| 3,117,888 | 1/1964 | Fox | 117—126 GQ X |
| 2,460,390 | 2/1949 | McDermott | 117—102 L X |
| 1,338,624 | 4/1920 | Heppes et al. | |
| 1,846,845 | 2/1932 | Clark. | |
| 2,569,755 | 10/1951 | Griffith, Jr. | 117—102 L X |
| 2,717,841 | 9/1955 | Biefeld et al. | 117—102 L |
| 2,899,339 | 8/1959 | Rakus | 117—102 L |

FOREIGN PATENTS

| 636,410 | 2/1962 | Canada | 117—102 L |

ALFRED L. LEAVITT, Primary Examiner

J. R. BATTEN, JR., Assistant Examiner

U.S. Cl. X.R.

65—11 W; 117—102 L, 119, 126 GQ